United States Patent
O'Driscoll et al.

(10) Patent No.: US 10,430,483 B2
(45) Date of Patent: Oct. 1, 2019

(54) SYSTEM AND METHOD FOR USE OF A MEDIA CONTENT BOT IN A SOCIAL MESSAGING ENVIRONMENT

(71) Applicant: SPOTIFY AB, Stockholm (SE)

(72) Inventors: Brendan O'Driscoll, San Francisco, CA (US); Matthew Montag, San Francisco, CA (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/856,960

(22) Filed: Dec. 28, 2017

(65) Prior Publication Data
US 2018/0189408 A1 Jul. 5, 2018

Related U.S. Application Data

(60) Provisional application No. 62/440,843, filed on Dec. 30, 2016.

(51) Int. Cl.
*G06F 16/00* (2019.01)
*G06F 16/9535* (2019.01)
*H04L 12/58* (2006.01)

(52) U.S. Cl.
CPC .......... *G06F 16/9535* (2019.01); *H04L 51/02* (2013.01); *H04L 51/32* (2013.01); *H04L 51/04* (2013.01); *H04L 51/10* (2013.01)

(58) Field of Classification Search
CPC ............. H04L 12/1813; H04L 12/1818; H04L 12/1822; H04L 12/1831; G06F 16/9535; H04N 51/32; H04N 51/02; H04N 51/10; H04N 51/04

USPC .......................................................... 707/710
See application file for complete search history.

(56) References Cited

U.S. PATENT DOCUMENTS

| | | | |
|---|---|---|---|
| 8,555,177 B1 * | 10/2013 | Junee | H04L 65/403 715/751 |
| 2002/0055973 A1 * | 5/2002 | Low | G06Q 30/06 709/204 |
| 2008/0133737 A1 | 6/2008 | Fischer et al. | |
| 2008/0134053 A1 | 6/2008 | Fischer | |

(Continued)

OTHER PUBLICATIONS

Extended European Search Report for European Patent Application No. 17208892.4 dated May 24, 2018, 7 pages.

(Continued)

*Primary Examiner* — Vincent F Boccio
(74) *Attorney, Agent, or Firm* — Tucker Ellis LLP

(57) ABSTRACT

In accordance with an embodiment, described herein is a system and method for enabling use of a media content bot in a social messaging environment that supports group chat. A conversational agent, generally referred to as a "bot", can leverage a user's interaction with the bot, to access a media server, which in turn can determine one or more items of media content appropriate for the user and/or their interaction. During a group chat, the bot can recognize music commands within the context of a particular discussion, and/or utilize music recommendation services provided by a digital media content environment, to determine items of media content appropriate for the group of users and/or their interaction. The system enables the use of media playback controls within the group chat, enabling the group of users to determine how and which media content is to be played.

20 Claims, 6 Drawing Sheets

(56) References Cited

U.S. PATENT DOCUMENTS

| | | | |
|---|---|---|---|
| 2008/0243632 A1 | 10/2008 | Kane et al. | |
| 2013/0159126 A1* | 6/2013 | Elkady | H04L 67/10 |
| | | | 705/26.1 |
| 2015/0067080 A1* | 3/2015 | Cho | H04W 4/12 |
| | | | 709/206 |
| 2016/0092522 A1 | 3/2016 | Harden et al. | |
| 2016/0255126 A1* | 9/2016 | Sarris | H04L 65/1096 |
| | | | 348/14.08 |
| 2017/0289305 A1* | 10/2017 | Liensberger | H04L 67/02 |
| 2018/0007206 A1* | 1/2018 | Klein | H04M 3/5191 |
| 2018/0089315 A1* | 3/2018 | Seiber | G06F 17/30772 |

OTHER PUBLICATIONS

Hong, et al., "Context-aware system for proactive personalized service based on context history", Expert Systems with Applications 36, 2009, pp. 7448-7457, 10 pages.

Communication under Rule 71(3), Intention to Grant for European Patent Application No. 17208892.4 dated Apr. 2, 2019, 30 pages.

\* cited by examiner

SYSTEM AND METHOD FOR USE OF A MEDIA CONTENT BOT IN A SOCIAL MESSAGING ENVIRONMENT

CLAIM OF PRIORITY

This application claims the benefit of priority to U.S. Provisional Patent Application titled "SYSTEM AND METHOD FOR USE OF A MEDIA CONTENT BOT IN A SOCIAL MESSAGING ENVIRONMENT", Application No. 62/440,843, filed Dec. 30, 2016; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing digital media content, and are particularly related to a system and method for enabling use of a media content bot in a social messaging environment that supports group chat.

BACKGROUND

In a social messaging environment that supports conversational messaging, for example through the use of a conversational agent or "bot", an increasingly common mode of user interaction is for users to communicate within a group chat or discussion. Often, the topic of a user's preference in music may arise within the context of a group chat. However, even if users are (physically) present in the same physical room, and are (virtually) present in the same group chat room, there may be no way for users to interact in such a manner as to control which music is playing in the physical room, or for the users to engage at the same time with a bot to control music playback or receive music recommendations.

SUMMARY

In accordance with an embodiment, described herein is a system and method for enabling use of a media content bot in a social messaging environment that supports group chat. A conversational agent, generally referred to as a "bot", can leverage a user's interaction with the bot, to access a media server, which in turn can determine one or more items of media content appropriate for the user and/or their interaction. During a group chat, the bot can recognize music commands within the context of a particular discussion, and/or utilize music recommendation services provided by a digital media content environment, to determine items of media content appropriate for the group of users and/or their interaction. The system enables the use of media playback controls within the group chat, enabling the group of users to determine how and which media content is to be played.

DETAILED DESCRIPTION

As described above, although a social messaging environment that supports conversational messaging may allow users to communicate in a group chat or discussion, there may be no way for users to interact in such a manner as to control which music is playing, or for the users to engage at the same time with a bot to control music playback or receive music recommendations.

In accordance with an embodiment, described herein is a system and method for enabling use of a media content bot in a social messaging environment that supports group chat. A conversational agent, generally referred to as a "bot", can leverage a user's interaction with the bot, to access a media server, which in turn can determine one or more items of media content appropriate for the user and/or their interaction. During a group chat, the bot can recognize music commands within the context of a particular discussion, and/or utilize music recommendation services provided by a digital media content environment, to determine items of media content appropriate for the group of users and/or their interaction. The system enables the use of media playback controls within the group chat, enabling the group of users to determine how and which media content is to be played.

Digital Media Content Environments

Figure 1:
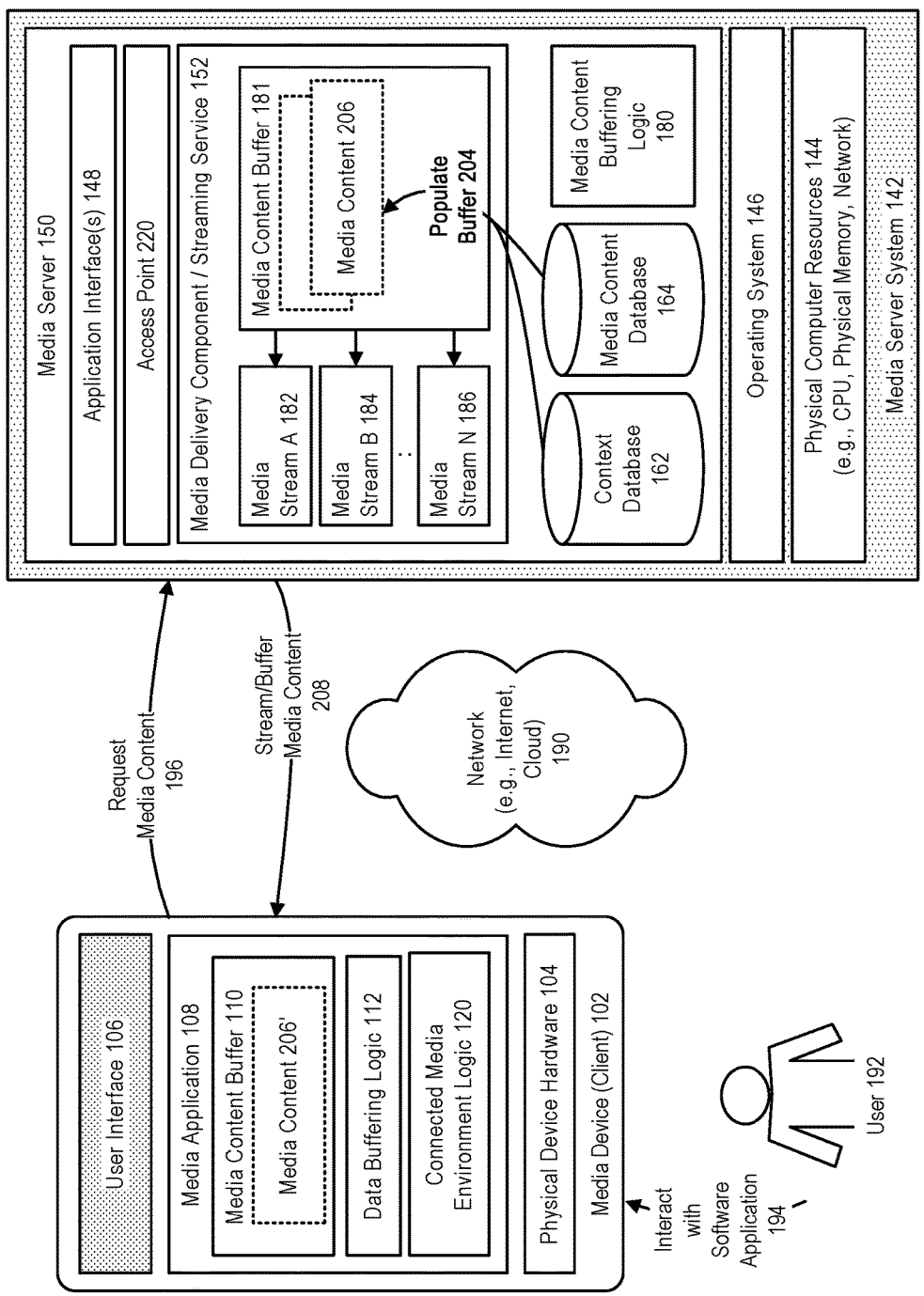
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, which can be provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Access to Media Content from Social Messaging Environments

In accordance with an embodiment, the system can enable access to digital media content via a social messaging environment, for example through the use of a client-side messaging application, or a software conversational agent or "bot". The media server can recommend or otherwise determine items of media content appropriate to a particular user interaction. The recommended media content can be provided to a media device, in the form of a link or other type of reference by which the user of the device can stream, download, access, or otherwise use the media content.

Figure 2:
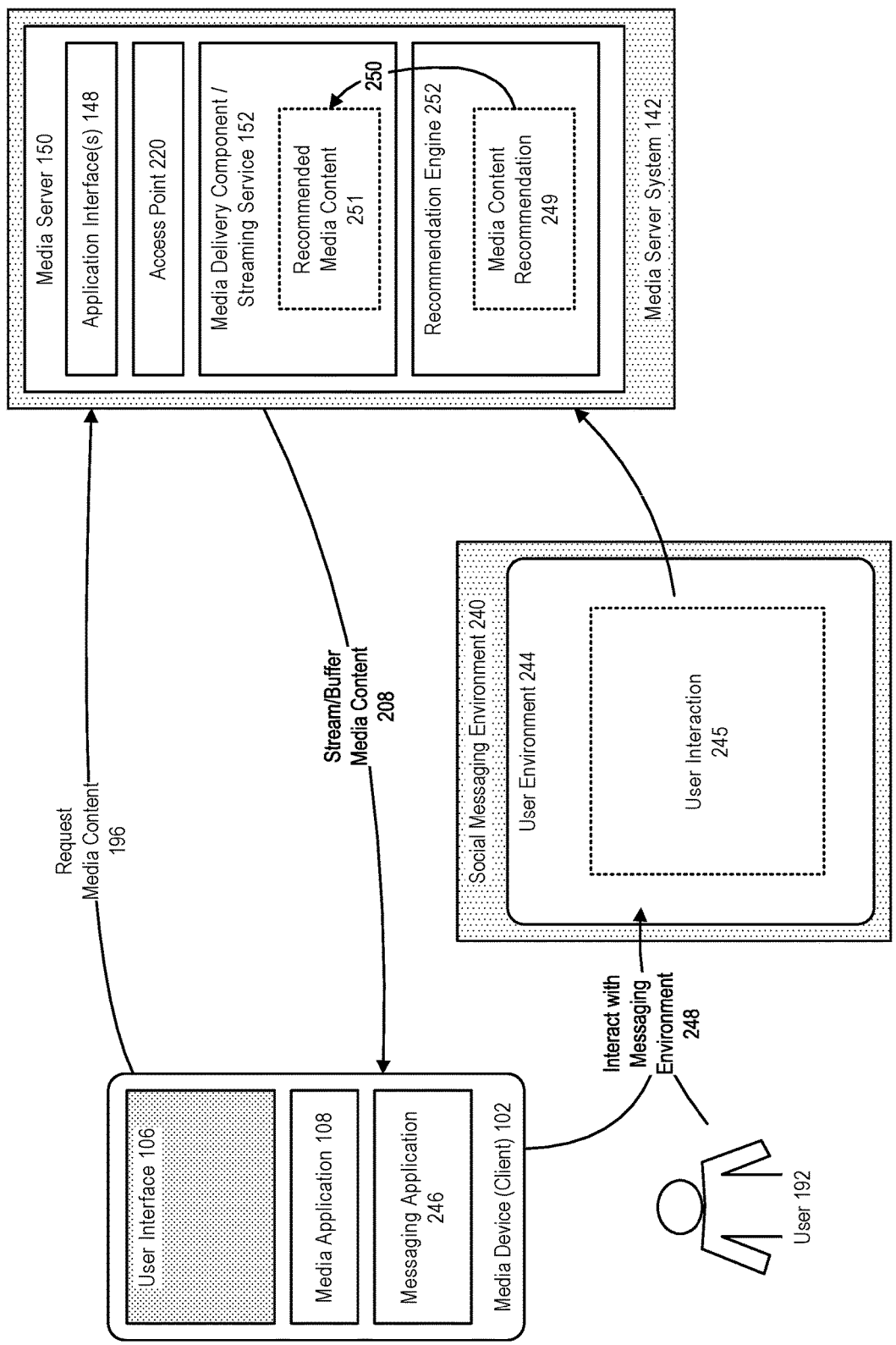
FIG. 2 illustrates a system which enables access to media content from a social messaging environment, in accordance with an embodiment.

FIG. 2 illustrates a system that enables access to media content from a social messaging environment, in accordance with an embodiment.

As illustrated in FIG. 2, in accordance with an embodiment, a social messaging environment 240 enables, for each user, a user environment 244 that provides a user experience, and the use of a messaging application 246 that enables interaction by the user with the social messaging environment and with other users.

In accordance with various embodiments, different types of social messaging environments can be supported, including, for example, social networking or social media environments (e.g., Instagram), which support the sharing of picture-based or other messages between different users, or social messaging environments (e.g., Facebook Messenger) which support the use of a media content bot that operates according to a bot conversation logic to provide access to a media content environment.

In accordance with an embodiment, the media server can include a recommendation application program interface (API), which is accessible, e.g., via a HTTP URL, and which provides access to a recommendation engine 252 that provides media content recommendations in response to interactions or conversations with the social messaging environment.

For example, in accordance with an embodiment, during the interaction 248 by a user with the social messaging environment, the messaging application or bot can access the media server, via the recommendation API, and provide a user interaction information 245, to the recommendation engine, for its use in determining a media content recommendation 249, and populating 250 the media delivery component or streaming service with the recommended media content 251.

The media server can then return, as part of the conversation or other interaction with the user, a media content recommendation in the form of a link or other type of reference by which the user of the device can stream, download, access, or otherwise use the media content.

In accordance with an embodiment, the recommendation engine can determine a media content recommendation based on criteria such as, for example, a user's prior listening history, or favorite media content; other user characteristics such as demographic information; external-sourced information, such as the current weather at the user's locations; or other types of criteria.

In accordance with an embodiment, once the link or other type of reference to access the recommended media content has been returned to the media device as part of the interaction, it can be processed by the media device, to request that the recommended media content be returned either to the media device or to a controlled device, for playback at that device.

For example, the link or reference to an item of media content can be provided as:

https://open.spotify.com/track/01G6a8O85SXIH05upiDN1N

The above link can then be passed or otherwise processed by a media server web service API, to request the associated media content.

In accordance with various embodiments, the messaging application or media content bot can either operate anonymously, or can perform an authentication or account verification at the media server, for example, to indicate the user as a Spotify user, and customize the response accordingly.

Conversational Social Messaging Environments

In accordance with an embodiment, the system enables the use of a conversational agent or bot which, which can be provided as software or program code that is executable by a computer system or other processing device, and provides a conversation-like interaction with a user, including simulating how a human participant might respond or otherwise behave as a conversational partner in response to input from the user.

For example, depending on the particular use case, a bot can be configured to scan for particular keywords within a text received as user input during a conversation with the bot, and respond accordingly to those keywords. Alternatively, the bot can be configured to employ natural language processing (NLP), to extract semantic or other useful information from the conversational text, and provide a more complex response.

In accordance with an embodiment, the system can employ a media content bot, which leverages a user's interaction with the bot, to access a media server, which in turn can determine one or more items of media content that are appropriate for the user and/or their interaction.

The recommended or otherwise determined media content can then be provided to the user, or to a media device, in the form of a link, playlist, or other type of reference by which the user can stream, download, access, or otherwise use the recommended media content.

Figure 3:
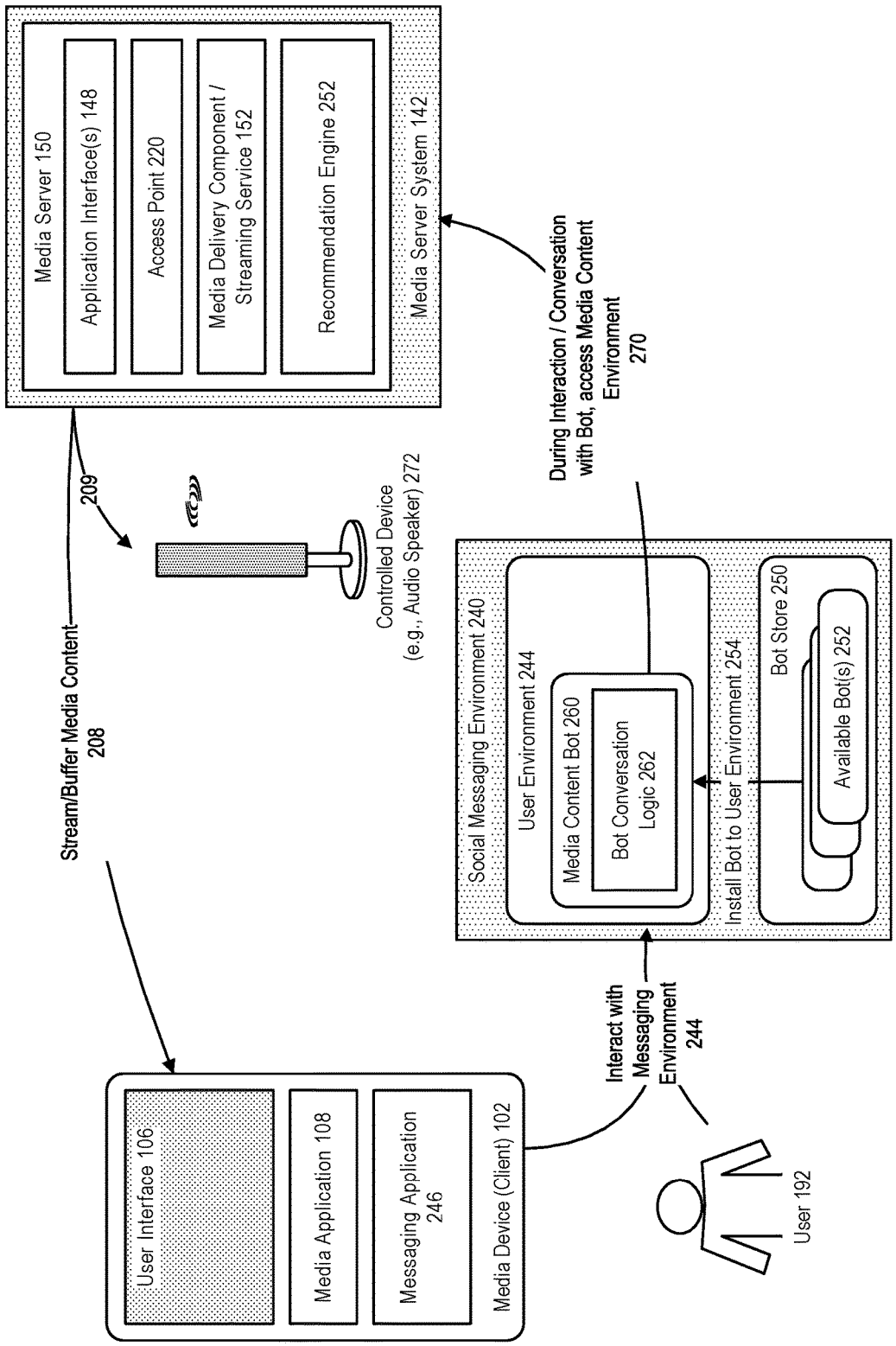
FIG. 3 illustrates the use of a social messaging environment with a digital media content environment, in accordance with an embodiment.

FIG. 3 illustrates the use of a social messaging environment with a digital media content environment, in accordance with an embodiment.

As illustrated in FIG. 3, in accordance with an embodiment, a social messaging environment enables a messaging application to be used by a user, to interact with the social messaging environment.

In accordance with an embodiment, the social messaging environment can provide a bot store 250, which operates as a shelf of one or more available bot(s) 252, which can be selected and installed 254 by a user, to operate within their user environment.

For example, in accordance with an embodiment, the store can include a media content bot 260, which includes and operates according to a bot conversation logic 262. Once installed, the media content bot can be used to provide access to a media content environment, from within a social messaging environment.

Depending on how the media content bot is configured, it can act in a reactive manner, awaiting an input from a user, or can act proactively, sending messages to the user in the manner of a push-notification.

In accordance with an embodiment, during the interaction with the media content bot, the bot can access the media content environment 270, and provide interaction information for use in determining a media content recommendation; and, if appropriate, populating the media delivery component or streaming service with the appropriate recommended media content, for delivery either to the user's media device (208) or to another device (209), for example a controlled device 272, such as an audio speaker or other output device.

Figure 4:
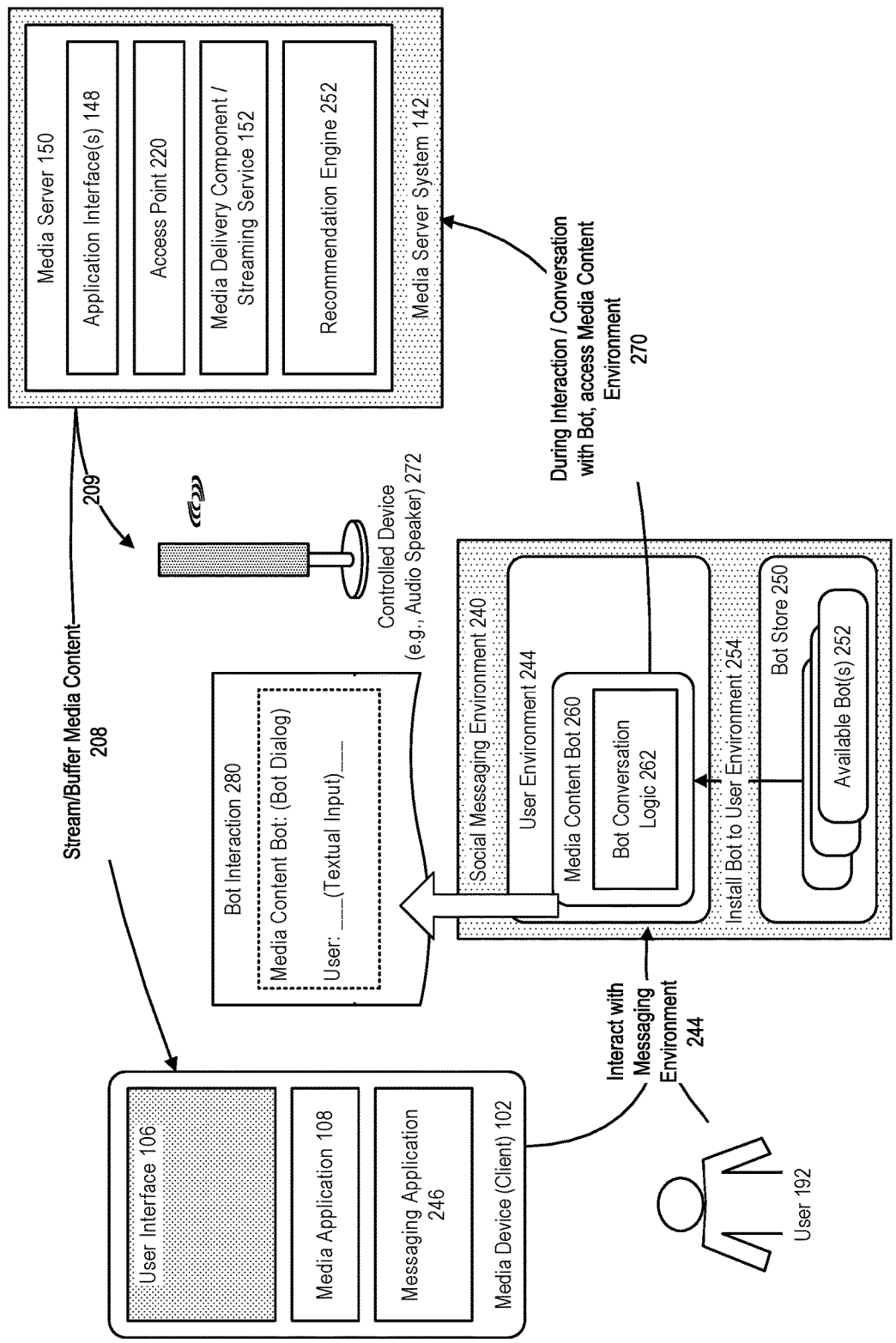
FIG. 4 further illustrates the use of social messaging environment with a digital media content environment, in accordance with an embodiment.

FIG. 4 further illustrates the use of social messaging environment with a digital media content environment, in accordance with an embodiment.

As illustrated in FIG. 4, in accordance with an embodiment, the system can respond at appropriate points during a bot interaction 280 or conversation by the user with the media content bot, for example in response to a user's text input or communication with the system or with other users.

In accordance with an embodiment, the user's interaction information can be communicated to the media server via the recommendation API, as input to the recommendation engine.

In accordance with an embodiment, the media server can then return to the media content bot, as part of the conversation or interaction with the user, a media content recommendation, in the form of a link, playlist, or other type of reference by which the user, or the controlled device, can stream, download, access, or otherwise use the recommended media content.

In accordance with an embodiment, once the reference to access the recommended media content has been returned to the user as part of an interaction, it can be processed by the user's media device as described above, to request that the recommended media content be returned either to the media device, or to a controlled or other device, for playback at that device.

In response to receiving such a request, the media server can stream or buffer the recommended media content.

For example, in accordance with an embodiment, the media content bot can be configured to parse a stream of input text within a user environment for, e.g., an artist name, such as the user indicating "My favorite artist is Rihanna". The artist name can be passed from the media content bot to the recommendation API. The resultant information received from the recommendation API can be provided in the manner of a conversation, e.g. "Thanks, do you want to hear some new tracks from Rihanna?", and can return a link, playlist, or other type of reference to that item of media content In accordance with an embodiment, the media content bot can either operate anonymously, or can perform an authentication or account verification, for example, to indicate the user as a Spotify user.

Depending on how the bot is configured, when a link, playlist, or other type of reference to an item of media content, is returned to a user's media device, the device can be either directed to a landing page (e.g., in a Web browser, or an app), or can request the user to log in, or can play the songs anonymously without requiring a login.

In accordance with an embodiment, when the media content bot is provided within the context of a connected media environment, the bot can also prompt the user to determine, for example, whether the recommended media content should be played on the user's media device, or at another (i.e., controlled) device.

Media Content Bots and Group Chat Environments

In accordance with an embodiment, the system enables use of a media content bot in a social messaging environment that supports group chat.

During a group chat, the bot can recognize music commands within the context of a particular discussion, and/or utilize music recommendation services provided by a digital media content environment, to determine items of media content appropriate for the group of users and/or their interaction.

The system enables the use of media playback controls within the group chat, enabling the group of users to determine how and which media content is to be played.

Figure 5:
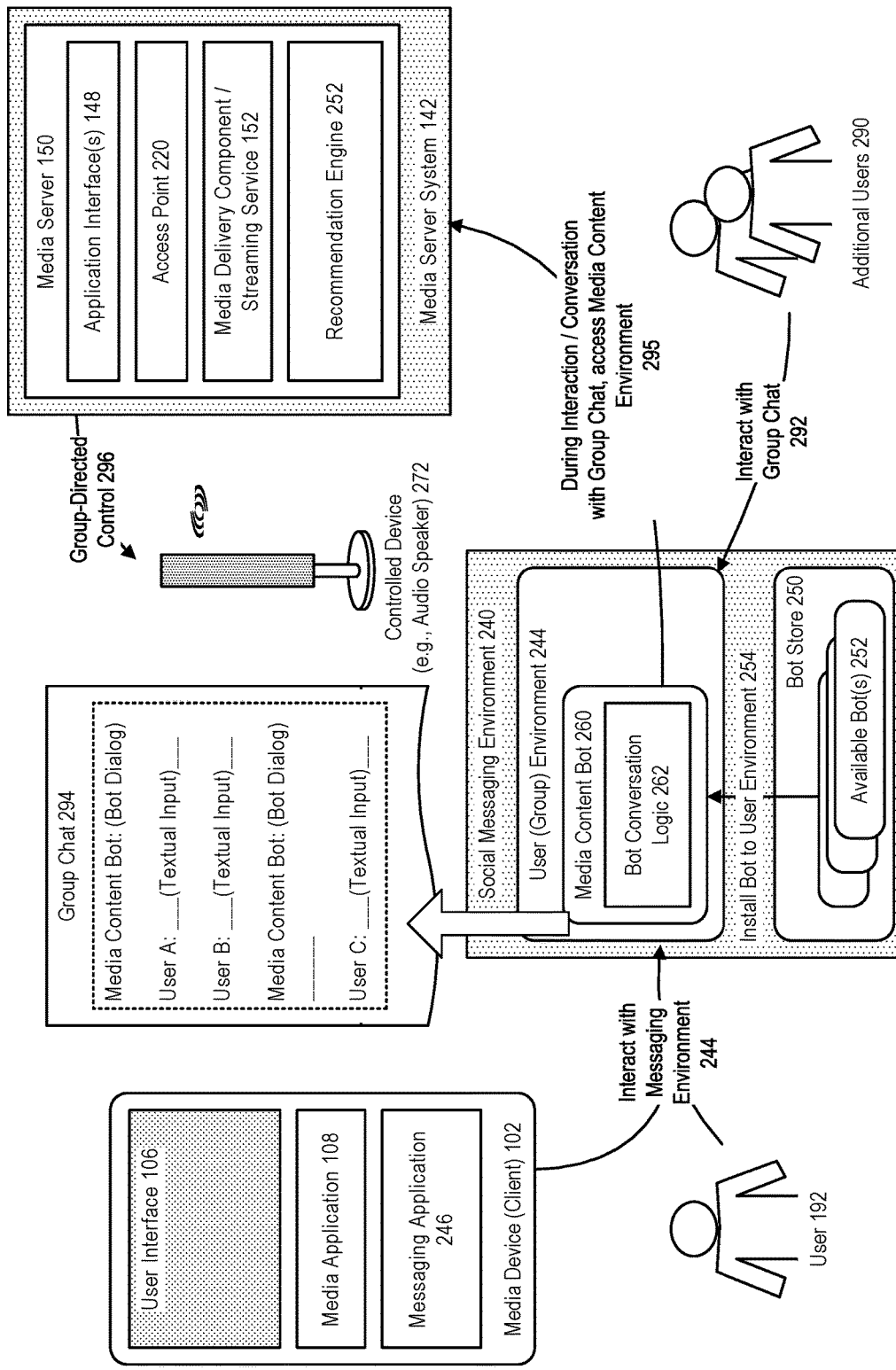
FIG. 5 illustrates the use of a media content bot in a social messaging environment that supports group chat, in accordance with an embodiment.

FIG. 5 illustrates the use of a media content bot in a social messaging environment that supports group chat, in accordance with an embodiment.

As illustrated in FIG. 5, in accordance with an embodiment, as additional users 290 interact with or otherwise participate 292 in the (group) bot interaction, for example as part of a group chat 294, the bot can similarly access the media content environment 295, and provide group interaction information, for use in determining a media content recommendation.

In this manner, the media content bot can operate in the form of an assistant or concierge, to assist the group of users in determining, or example, an appropriate media content to play, or at which device the media content should be played.

As described above, in accordance with an embodiment, the media server can then respond, if appropriate, by populating the media delivery component or streaming service with the appropriate recommended media content, for delivery to a device, for example to an audio speaker or other controlled output device, reflecting a group-directed control 296.

For example, in accordance with an embodiment, the system enables multiple users, who may or may not be physically present in a same room, to participate in a group chat in such a manner as to control which music is to be played in that room.

As another example, in accordance with an embodiment, the system enables multiple users to engage, at the same time, with a bot as part of a group chat, to control the selection of music playback, or to receive music recommendations.

In accordance with an embodiment, the media content bot can be configured to help guide users within the context of a group chat or discussion, to control the playback of a particular media content, as illustrated in the example interaction below:

| Media Content Bot: | Users (Group Chat): |
|---|---|
| How can I help you? | (Oscar): Play Justin Bieber |
| . | /spotify queue Justin Bieber |
| . | (Media Content Bot): Sure thing, Oscar! |

As illustrated above, each user can interact with the media content bot, for example to request that a particular item of media content be played. However, as the group further interacts with the media content bot, the bot can respond accordingly, for example:

| Media Content Bot: | Users (Group Chat): |
|---|---|
| How can I help you? | (Oscar): Play Justin Bieber |
| . | /spotify queue Justin Bieber |
| . | (Media Content Bot): Sure thing, Oscar! |
| . | (Alva): Noooo |
| . | /spotify skip Justin Bieber |

For example, in this illustration, the media content bot can be configured to respond by waiting, until the group has generally agreed on a next song to play, and instructed the bot accordingly, at which point the bot can proceed as directed:

| Media Content Bot: | Users (Group Chat): |
|---|---|
| How can I help you? | (Oscar): Play Justin Bieber |
| . | /spotify queue Justin Bieber |
| . | (Media Content Bot): Sure thing, Oscar! |
| . | (Alva): Noooo |
| . | /spotify skip Justin Bieber |
| . | (Matt): /spotify queue VHS head |
| . | (Alva): Niice |
| . | /spotify play Billy Joel |
| Play Billy Joel next! | |

The above interaction is provided by way of example, to illustrate an interaction between a group of users and a media content bot within the context of a group chat or discussion, in accordance with a particular embodiment. In accordance with other embodiments, other types or forms of media content bots and interactions can be supported.

In accordance with an embodiment, a similar approach can also be used to enable the group to control other aspects of their physical or virtual environment, via the media content bot and a group chat, for example by controlling the ambient lighting of their room or the volume at which a media content is played, or by determining to promote a particular artist within a social messaging environment.

Figure 6:
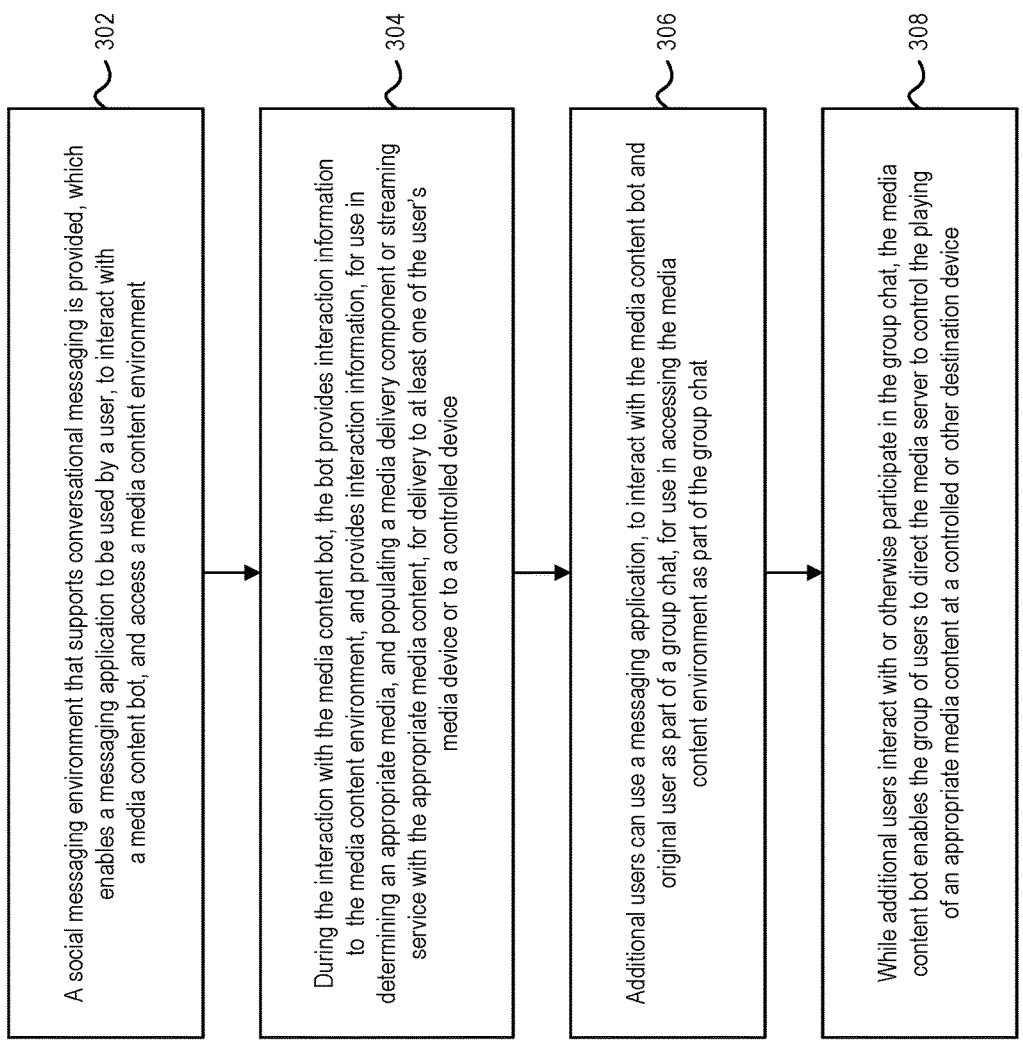
FIG. 6 illustrates a process of enabling use of a media content bot in a social messaging environment that supports group chat, in accordance with an embodiment.

FIG. 6 illustrates a process of enabling use of a media content bot in a social messaging environment that supports group chat, in accordance with an embodiment.

As illustrated in FIG. 6, in accordance with an embodiment, at step 302, a social messaging environment that supports conversational messaging is provided, which enables a messaging application to be used by a user, to interact with a media content bot, and access a media content environment.

At step 304, during the interaction with the media content bot, the bot provides interaction information to the media content environment, and provides interaction information, for use in determining an appropriate media, and populating a media delivery component or streaming service with the appropriate media content, for delivery to at least one of the user's media device or to a controlled device.

At step 306, additional users can use a messaging application, to interact with the media content bot and original user as part of a group chat, for use in accessing the media content environment as part of the group chat.

At step 308, while additional users interact with or otherwise participate in the group chat, the media content bot enables the group of users to direct the media server to control the playing of an appropriate media content at a controlled or other destination device.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for enabling use of a media content bot in a social messaging environment that supports group chat, comprising:

a computer, including a media server executing thereon that receives requests from client media devices for media content, wherein the media server includes an application program interface that enables access to a recommendation engine, and returns media content recommendations as links or references by which items of media content can be downloaded or accessed; and a conversational agent provided within a social messaging environment, and operating as a media content bot, which participates in an interaction with a plurality of client media devices associated with a plurality of users as part of a group chat, including recognizing media content commands received within the group chat, and responds to the received media content commands by:

accessing the media server via the application program interface and providing interaction information associated with the group chat to the media server, including input text or other communications received during the group chat, for use by the media server in determining one or more recommended items of media content based at least in part on the provided interaction information, receiving, from the media server, links or references to the one or more recommended items of media content, and updating the group chat, including providing an identification of the one or more recommended items of media content, for selection and delivery to one or more of the plurality of client media devices; and wherein the links or references received from the media server are used to control playback of the one or more recommended items of media content at one or more of the plurality of client media devices associated with the plurality of users as part of the group chat.

2. The system of claim 1, wherein the system enables the plurality of client media devices associated with the plurality of users as part of the group chat, who may or may not be physically present in the same room, to participate in a group chat in such a manner as to control which music is playing in the room.

3. The system of claim 1, wherein the system enables the plurality of client media devices associated with the plurality of users as part of the group chat to engage, at the same time, with the media content bot as part of the group chat, to control music playback or to receive music recommendations.

4. The system of claim 1, wherein the media content bot is provided within the context of a connected media environment, including determining whether to play the one or more recommended items of media content at one or more of the client media devices associated with the plurality of users as part of the group chat, or at another, controlled device.

5. The system of claim 1, wherein the system, via the media content bot, enables control of ambient lighting in a room in which one or more of the plurality of users as part of the group chat is present.

6. The system of claim 1, wherein the system, via the media content bot, enables control of a playback volume at which the one or more recommended items of media content is played at one or more of the plurality of client media devices associated with the plurality of users as part of the group chat.

7. The system of claim 1, wherein the media content bot is configured to perform an authentication or account verification at the media server, and determine the one or more recommended items of media content using information associated therewith.

8. A method of providing access to digital media content within a conversational social messaging environment that supports group chat, comprising:

providing, at a computer, a media server executing thereon that receives requests from client media devices for media content, wherein the media server includes an application program interface that enables access to a recommendation engine, and returns media content recommendations as links or references by which items of media content can be downloaded or accessed; and providing a conversational agent within a social messaging environment, operating as a media content bot, which participates in an interaction with a plurality of client media devices associated with a plurality of users as part of a group chat, including recognizing media content commands received within the group chat, and responds to the received media content commands by:

accessing the media server via the application program interface and providing interaction information associated with the group chat to the media server, including input text or other communications received during the group chat, for use by the media server in determining one or more recommended items of media content based at least in part on the provided interaction information, receiving, from the media server, links or references to the one or more recommended items of media content, and updating the group chat, including providing an identification of the one or more recommended items of media content, for selection and delivery to one or more of the plurality of client media devices; and wherein the links or references received from the media server are used to control playback of the one or more recommended items of media content at one or more of the plurality of client media devices associated with the plurality of users as part of the group chat.

9. The method of claim 8, wherein the media content bot enables the plurality of client media devices associated with the plurality of users as part of the group chat, who may or may not be physically present in the same room, to participate in a group chat in such a manner as to control which music is playing in the room.

10. The method of claim 8, wherein the media content bot enables the plurality of client media devices associated with the plurality of users as part of the group chat to engage, at the same time, with the media content bot as part of the group chat, to control music playback or to receive music recommendations.

11. The method of claim 8, wherein the media content bot is provided within the context of a connected media environment, including determining whether to play the one or more recommended items of media content at one or more of the client media devices associated with the plurality of users as part of the group chat, or at another, controlled device.

12. The method of claim 8, wherein the media content bot enables control of ambient lighting in a room in which one or more of the plurality of users as part of the group chat is present.

13. The method of claim 8, wherein the media content bot enables control of a playback volume at which the one or more recommended items of media content is played at one or more of the plurality of client media devices associated with the plurality of users as part of the group chat.

14. The method of claim 8, wherein the media content bot is configured to perform an authentication or account verification at the media server, and determine the one or more recommended items of media content using information associated therewith.

15. A non-transitory computer readable storage medium, including instructions stored thereon which when read and executed by one or more computers cause the one or more computers to perform the steps comprising:

providing a media server that receives requests from client media devices for media content, wherein the media server includes an application program interface that enables access to a recommendation engine, and returns media content recommendations as links or references by which items of media content can be downloaded or accessed; and providing a conversational agent within a social messaging environment, operating as a media content bot, which participates in an interaction with a plurality of client media devices associated with a plurality of users as part of a group chat, including recognizing media content commands received within the group chat, and responds to the received media content commands by:
accessing the media server via the application program interface and providing interaction information associated with the group chat to the media server, including input text or other communications received during the group chat, for use by the media server in determining one or more recommended items of media content based at least in part on the provided interaction information, receiving, from the media server, links or references to the one or more recommended items of media content, and updating the group chat, including providing an identification of the one or more recommended items of media content, for selection and delivery to one or more of the plurality of client media devices; and wherein the links or references received from the media server are used to control playback of the one or more recommended items of media content at one or more of the plurality of client media devices associated with the plurality of users as part of the group chat.

16. The non-transitory computer readable storage medium of claim 15, wherein the media content bot enables the plurality of client media devices associated with the plurality of users as part of the group chat, who may or may not be physically present in the same room, to participate in a group chat in such a manner as to control which music is playing in the room.

17. The non-transitory computer readable storage medium of claim 15, wherein the media content bot enables the plurality of client media devices associated with the plurality of users as part of the group chat to engage, at the same time, with the media content bot as part of the group chat, to control music playback or to receive music recommendations.

18. The non-transitory computer readable storage medium of claim 15, wherein the media content bot is provided within the context of a connected media environment, including determining whether to play the one or more recommended items of media content at one or more of the client media devices associated with the plurality of users as part of the group chat, or at another, controlled device.

19. The non-transitory computer readable storage medium of claim 15, wherein the media content bot enables control of ambient lighting in a room in which one or more of the plurality of users as part of the group chat is present.

20. The non-transitory computer readable storage medium of claim 15, wherein the system enables control of a playback volume at which the one or more recommended items of media content is played at one or more of the plurality of client media devices associated with the plurality of users as part of the group chat.

* * * * *